(12) United States Patent
Foote

(10) Patent No.: US 7,699,478 B2
(45) Date of Patent: Apr. 20, 2010

(54) COORDINATED PIVOTING AND EXTENDING VEHICLE MIRROR

(75) Inventor: Keith D. Foote, Kentwood, MI (US)

(73) Assignee: Magna Mirrors of America, Inc., Kentwood, MI (US)

( * ) Notice: Subject to any disclaimer, the term of this patent is extended or adjusted under 35 U.S.C. 154(b) by 0 days.

(21) Appl. No.: 12/435,650

(22) Filed: May 5, 2009

(65) Prior Publication Data

US 2009/0213479 A1    Aug. 27, 2009

Related U.S. Application Data

(60) Division of application No. 11/935,531, filed on Nov. 6, 2007, now Pat. No. 7,530,700, which is a continuation of application No. 11/621,374, filed on Jan. 9, 2007, now Pat. No. 7,293,887, which is a continuation of application No. 10/908,603, filed on May 18, 2005, now Pat. No. 7,159,992, which is a continuation of application No. 10/711,276, filed on Sep. 7, 2004, now Pat. No. 6,896,385, which is a continuation of application No. 10/361,077, filed on Feb. 7, 2003, now Pat. No. 6,799,856, which is a division of application No. 09/830,999, filed as application No. PCT/US99/25614 on May 2, 2001, now Pat. No. 6,755,543.

(60) Provisional application No. 60/106,674, filed on Nov. 2, 1998.

(51) Int. Cl.
*G02B 5/08*     (2006.01)
*G02B 7/18*     (2006.01)

(52) U.S. Cl. ............................ 359/841; 359/877

(58) Field of Classification Search .............. 359/841, 359/872, 877

See application file for complete search history.

(56) References Cited

U.S. PATENT DOCUMENTS

| | | | |
|---|---|---|---|
| 4,363,534 A | 12/1982 | Covert | |
| 4,558,930 A | 12/1985 | Deedreek | |
| 4,911,545 A | 3/1990 | Miller | |
| 4,929,878 A | 5/1990 | Hansen | |
| 5,375,014 A | 12/1994 | Fujie et al. | |
| 5,477,390 A * | 12/1995 | Boddy et al. | 359/841 |
| 5,572,376 A | 11/1996 | Pace | |
| 5,640,281 A | 6/1997 | Cho | |
| 5,701,211 A | 12/1997 | Perry et al. | |
| 5,703,732 A | 12/1997 | Boddy et al. | |
| 5,864,438 A | 1/1999 | Pace | |
| 5,886,838 A | 3/1999 | Kuramoto | |
| 5,903,402 A | 5/1999 | Hoek | |
| 5,969,890 A | 10/1999 | Whitehead | |
| 6,183,096 B1 | 2/2001 | Galicia | |
| 6,598,983 B1 | 7/2003 | Boddy | |

* cited by examiner

*Primary Examiner*—Alessandro Amari
(74) *Attorney, Agent, or Firm*—McGarry Bair PC

(57) ABSTRACT

An exterior vehicle mirror system has a vehicle mountable support and a support arm. A mirror housing is movable along the support arm between the support and a distal end. An electrically powered mirror unit adjust mechanism can adjust the mirror unit about horizontal and vertical axes. An electrically powered pivoting and extending mechanism pivots the support arm about the support between an extended position and a position folded against a vehicle side. An electronic control system controls movement of the mirror housing along the support arm, and folding of the support arm, independent of an adjustment of the mirror unit. The electronic control system comprises a memorized position for the powered pivoting and extending mechanism.

6 Claims, 8 Drawing Sheets

COORDINATED PIVOTING AND EXTENDING VEHICLE MIRROR

CROSS-REFERENCE TO RELATED APPLICATIONS

This application is a divisional of U.S. application Ser. No. 11/935,531, filed Nov. 6, 2007, now issued as U.S. Pat. No. 7,530,700, which is a continuation of U.S. application Ser. No. 11/621,374, filed Jan. 9, 2007, now issued as U.S. Pat. No. 7,293,887, which is a continuation of U.S. application Ser. No. 10/908,603, filed May 18, 2005, now issued as U.S. Pat. No. 7,159,992, which is a continuation of U.S. application Ser. No. 10/711,276, filed Sep. 7, 2004, now issued as U.S. Pat. No. 6,896,385, which is a continuation of U.S. application Ser. No. 10/361,077, filed Feb. 7, 2003, now issued as U.S. Pat. No. 6,799,856, which is a divisional of U.S. application Ser. No. 09/830,999, filed May 2, 2001, now issued as U.S. Pat. No. 6,755,543, which is a national stage application pursuant to 35 U.S.C. §371 of International Application No. PCT/US99/25614, filed Nov. 1, 1999, which claims the benefit of U.S. Provisional Application Ser. No. 60/106,674, filed Nov. 2, 1998.

BACKGROUND OF THE INVENTION

1. Field of the Invention

The subject invention relates to a mirror assembly for attachment to the side of an automotive vehicle and which may be adjusted to various positions.

2. Description of the Prior Art

Automobiles and trucks are provided with side-mounted rear view mirrors for providing the driver with a desired field of view extending behind and along the side of the vehicle. Some vehicles, such as trucks and vehicles with trailers, have side-mounted rear view mirrors with enhanced fields of view. For example, vehicles with trailers have side-mounted rear view mirrors which extend out further than those of a typical automobile. These laterally "extended" mirrors provide the driver with a field of view which covers an area reaching behind and alongside the trailer and which is unobstructed by the trailer.

However, a driver of a vehicle carrying a large trailer will encounter various situations in which it will be necessary to adjust the position of an extended rear view mirror. For example, the angular position of the mirror is adjusted to accommodate the requirements of different drivers and to accommodate changing requirements of the same driver as the size of the truck trailer changes. A truck driver may also encounter obstacles such as tollgates, loading/unloading docks, narrow driveways, and so on. When those obstacles are encountered, the mirror's lateral position may either limit the driver's ability to maneuver around the obstacle or require the driver to manually move the mirror beforehand. It is often necessary to move the mirror to a position next adjacent the vehicle to clear obstacles. In addition, there is a need to control the movement of the mirror remotely from with in the vehicle.

Various assemblies are known in the prior art for adjusting a mirror assembly between inner and outer extended positions, as exemplified in U.S. Pat. No. 4,911,545 to Miller and U.S. Pat. No. 5,572,376 to Pace, while others disclose assemblies for rotating the mirror assembly to a folded position adjacent the vehicle, as exemplified in U.S. Pat. No. 4,363,534 to Covert, U.S. Pat. No. 5,375,014 to Fujie et al and U.S. Pat. No. 5,703,732 to Boddy et al. However, there remains a need for a mirror assembly which can be remotely controlled by power to both be extended and retracted as well as be rotated or pivoted to a folded position adjacent the vehicle.

BRIEF DESCRIPTION OF THE INVENTION

An exterior vehicle mirror system has a vehicle mountable support and a support arm. A mirror housing is movable along the support arm between the support and a distal end. An electrically powered mirror unit adjust mechanism can adjust the mirror unit about horizontal and vertical axes. An electrically powered pivoting and extending mechanism pivots the support arm about the support between an extended position and a position folded against a vehicle side. An electronic control system controls movement of the mirror housing along the support arm, and folding of the support arm, independent of an adjustment of the mirror unit. The electronic control system comprises a memorized position for the powered pivoting and extending mechanism.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF EMBODIMENTS OF THE INVENTION

Figure 1:
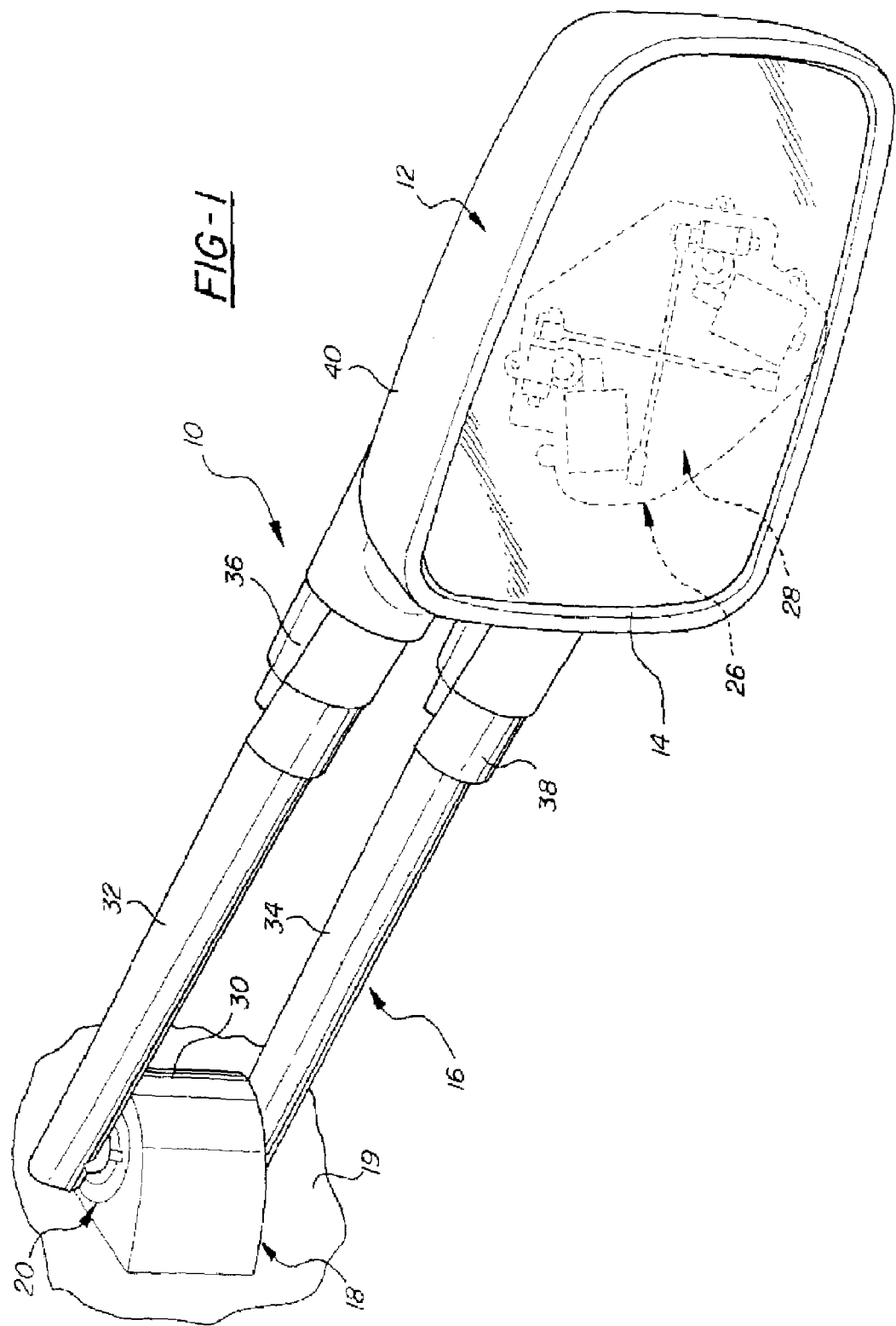
FIG. 1 is a perspective view showing the mirror assembly in an extended position relative to a vehicle.

Referring now to the drawings in greater detail, FIG. 1 illustrates a vehicle mirror assembly 10, which includes a mirror housing 12 supported by a swingable structure 16. A fixed support 18 is constructed and arranged to be fixedly mounted on a vehicle 19 and supports swingable structure 16 in an operative position extending laterally outwardly from the vehicle. Mirror housing 12 is provided with, among other elements, a mirror unit 14, which serves as an exterior rear view mirror for the vehicle's driver.

A first power mechanism 20 is provided in association with the fixed support 18 and with swingable structure 16, and is arranged to enable swingable structure 16 to be pivoted with respect to fixed support 18 about a generally upright axis defined by the axis of rotation of first power mechanism 20. Swingable structure 16 may then be pivoted (1) between its operative position (extending laterally outwardly from the vehicle to allow the driver of the vehicle to utilize mirror unit 14 as an exterior rear view mirror) and a folded position in response to power operation of first power mechanism 20. The first power mechanism 20 further allows swingable structure 16 to be pivoted from its operative position in either direction in response to an unwanted impact below applied in either direction to either swingable structure 16 or to mirror housing 12. In the illustrated embodiment, the folded position of swingable structure 16 in response to power operation of first power mechanism 20 is the position at which the face of mirror unit 14 is put in close proximity or next adjacent to the vehicle; for example, almost touching the side panel of the vehicle's door (not shown).

Figure 2:
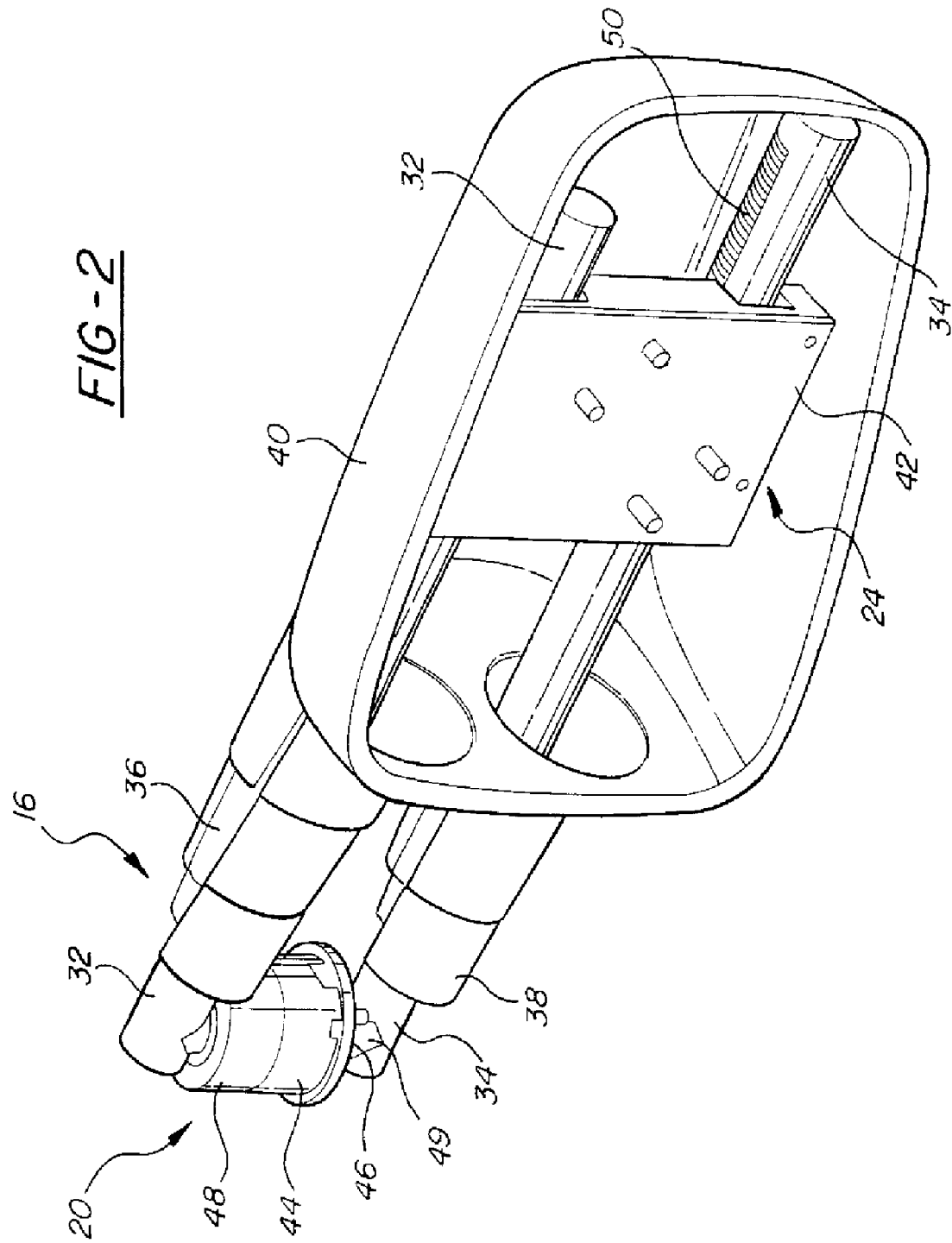
FIG. 2 is a perspective view of certain components of the mirror assembly in a retracted position relative to the vehicle.
Figure 3:
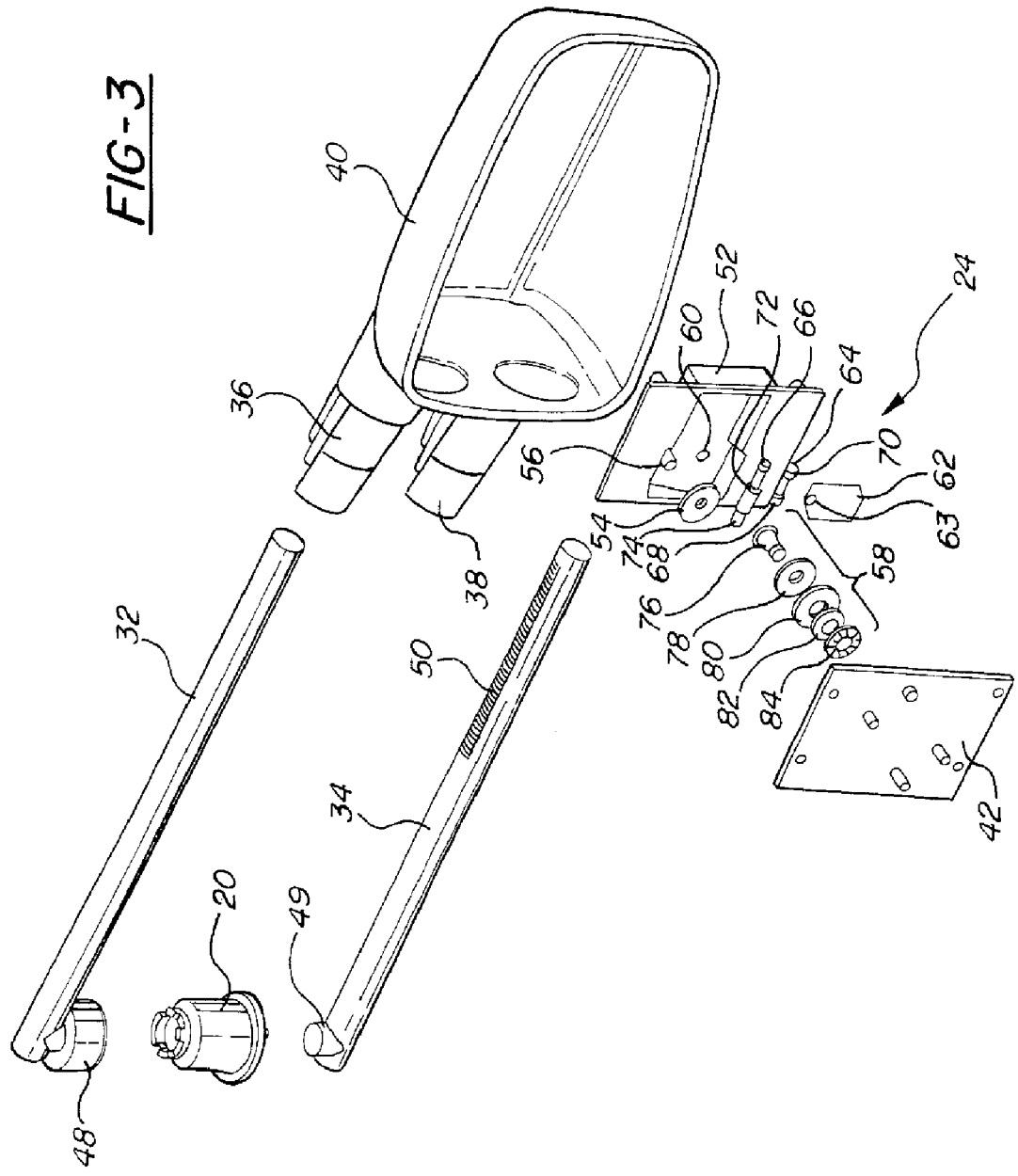
FIG. 3 is an exploded view of the components shown in FIG. 2.

A second power mechanism 24, as shown in FIGS. 2 and 3, is operatively associated with a swingable structure 16 and mirror housing 12 to move mirror housing 12 between inner or retracted (see FIG. 2) and outer or extended (see FIG. 1) limiting positions into a desired position of adjustment upon the power operation of the second power mechanism 24. The mirror holder 26 (see FIG. 1) comprises a known electrically powered third power mechanism 28 operatively associated with mirror housing 12 and mirror holder 26 to move mirror unit 14 into a desired adjusted position about horizontal and vertical axes.

FIG. 2 shows main housing portion 40 in the inner limiting position with respect to upper support arm 32 and lower support arm 34. The second power mechanism 24 is shown having a cover 42, which serves as a mirror holder support for carrying mirror holder 26. The first power mechanism 20 has an upper casing 44 secured to a lower casing 46. Upper support 32 comprises an upper mating portion 48 for mating with a cylindrical drive member of first power mechanism 20 and a lower mating portion 49 inserted within a cylindrical recess provided in a lower portion of first power mechanism 20.

FIG. 3 shows an exploded view of the components shown in FIG. 2. As illustrated in FIG. 3, the second power mechanism 24 comprises a clutch assembly 58, a motor 62, a primary shaft 64, an intermediate shaft 66, and an upper drive pinion gear 54. The upper drive pinion gear 54 is mountable on an upper shaft 56, while clutch assembly 58 is mountable within a recess 60 provided at a mid-portion of mounting structure 52. Also included are a worm 74, a shaft 76, a lower pinion 78, a worm gear 80, a spring 82, and a push nut 84.

Figure 5:
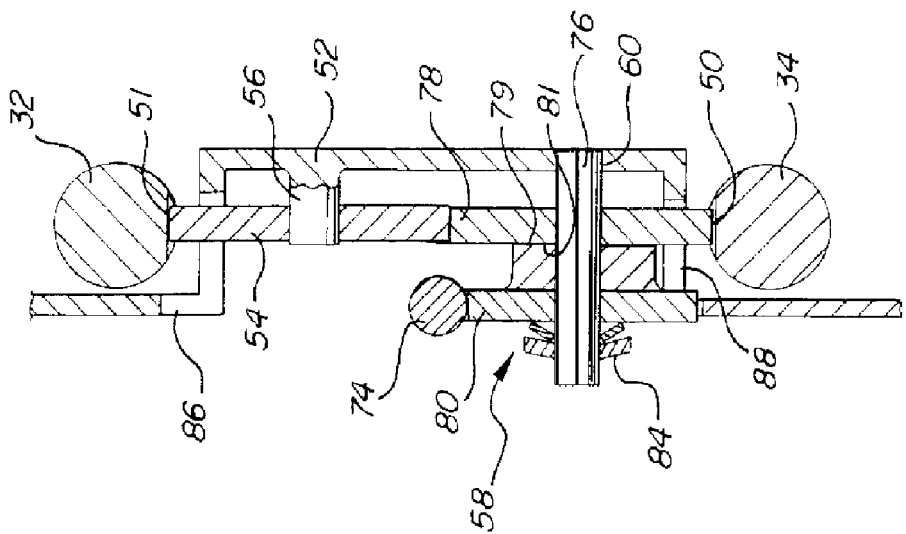
FIG. 5 is a cross-sectional view taken along the line 5-5 of FIG. 4.
Figure 4:
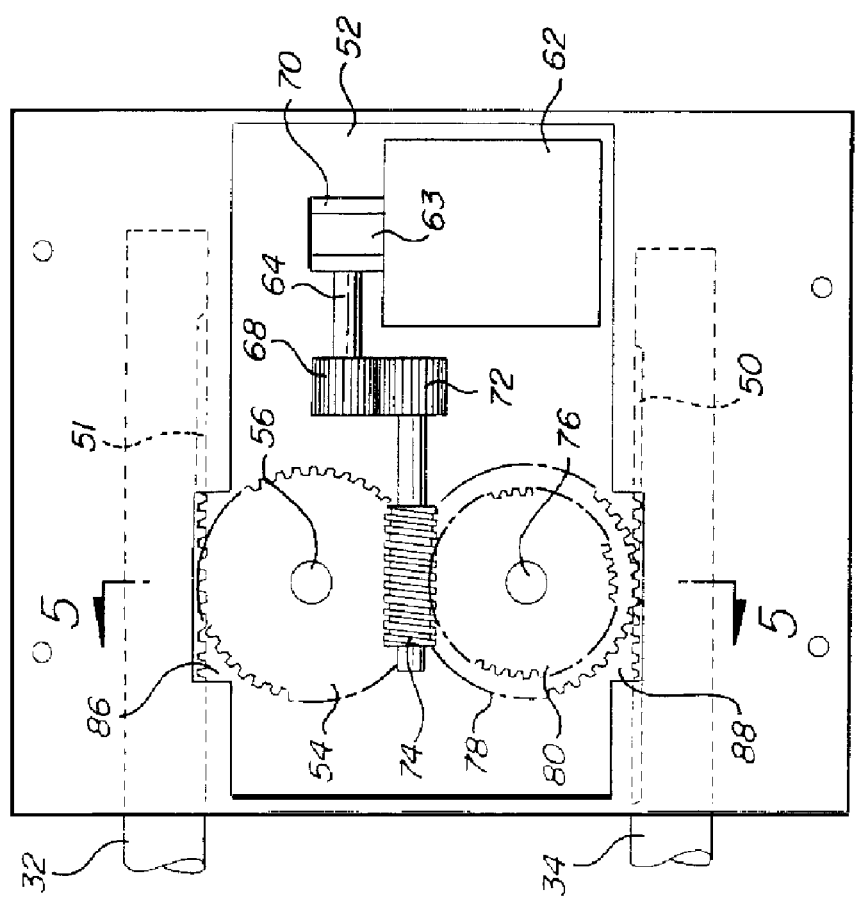
FIG. 4 is a front view of the components shown in FIG. 2.

FIGS. 4 and 5 further illustrate the manner in which the various components of the second power mechanism 24 are assembled and interoperate to move mirror housing 12 between inner and outer limiting positions in relation to swingable structure 16, which comprises upper and lower support arms 32, 34 in the illustrated embodiment.

In their assembled states, upper pinion gear 54 mates with lower pinion gear 78. Lower pinion gear 78 is driven by worm gear 80 which interfaces with worm 74 of intermediate shaft 66. Intermediate shaft 66 is set into rotation by a gear 68 of primary shaft 64 interfacing with gear 72 of intermediate shaft 66. Motor worm drive shaft 63 of motor 62 interfaces with gear 70 to cause primary shaft 64 to rotate.

FIG. 5 shows a cross-section of the assembly shown in FIG. 4 taken along the line 5-5. Each of upper and lower support arms 32, 34 includes a respective lower rack 50 and upper rack 51, each of which runs longitudinally along opposing lower and upper surfaces of the support arms 32 and 34. The rack 51 interfaces with the upper pinion 54. The lower rack 50 of lower support arm 34 interfaces with the lower pinion 78. The upper pinion 54 is mounted on a shaft 56, which in the illustrated embodiment is integrally formed with mounting structure 52. Clutch assembly 58 is mounted on a shaft 76, which is provided within a recess 60 of mounting structure 52. As described previously, in the illustrated embodiment, clutch assembly 58 includes the lower pinion 78, a worm gear 80, a spring 82, and a push nut 84. The worm gear 80 comprises an extending portion 83 and a first clutch face 81. The lower pinion 78 comprises a second clutch face 79. When clutch assembly 58 is assembled as shown in FIG. 5, first clutch face 81 comes into contact with second clutch face 79.

The upper pinion 54 is disposed so that it extends through upper gear opening 86 in a manner to allow interfacing with rack 51 of upper support arm 32. Similarly, worm gear 80 and lower pinion 78 are disposed in lower gear opening 88, and lower pinion 78 extends through lower gear opening 88 in a manner so that lower pinion 78 can interface with rack 50 of lower support arm 34.

Figure 6:
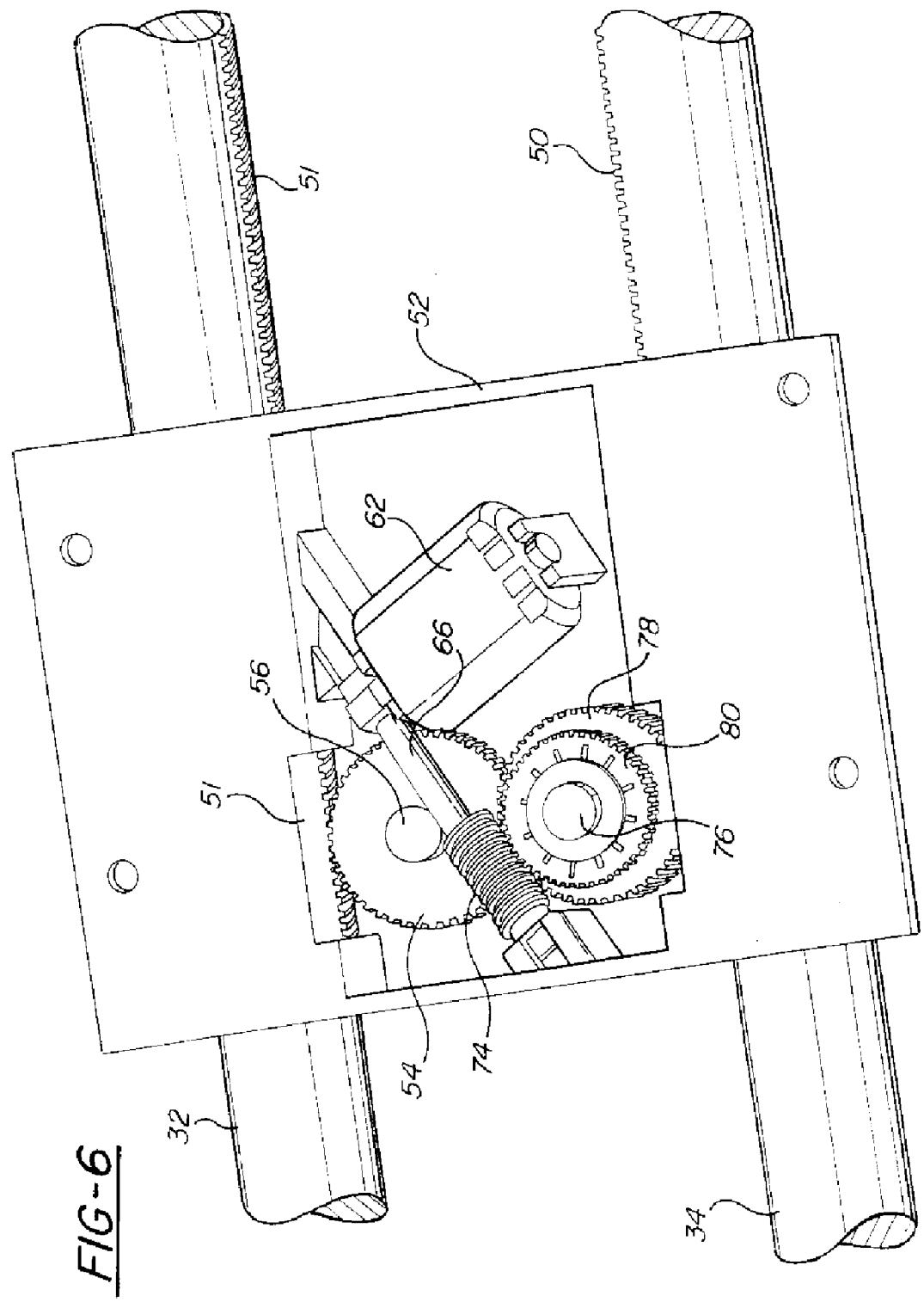
FIG. 6 is a perspective view of an alternative arrangement of the components shown in FIG. 2.

The assembly shown in FIG. 6 includes the same basic components, just arranged in a different orientation relative to one another.

Figure 7:
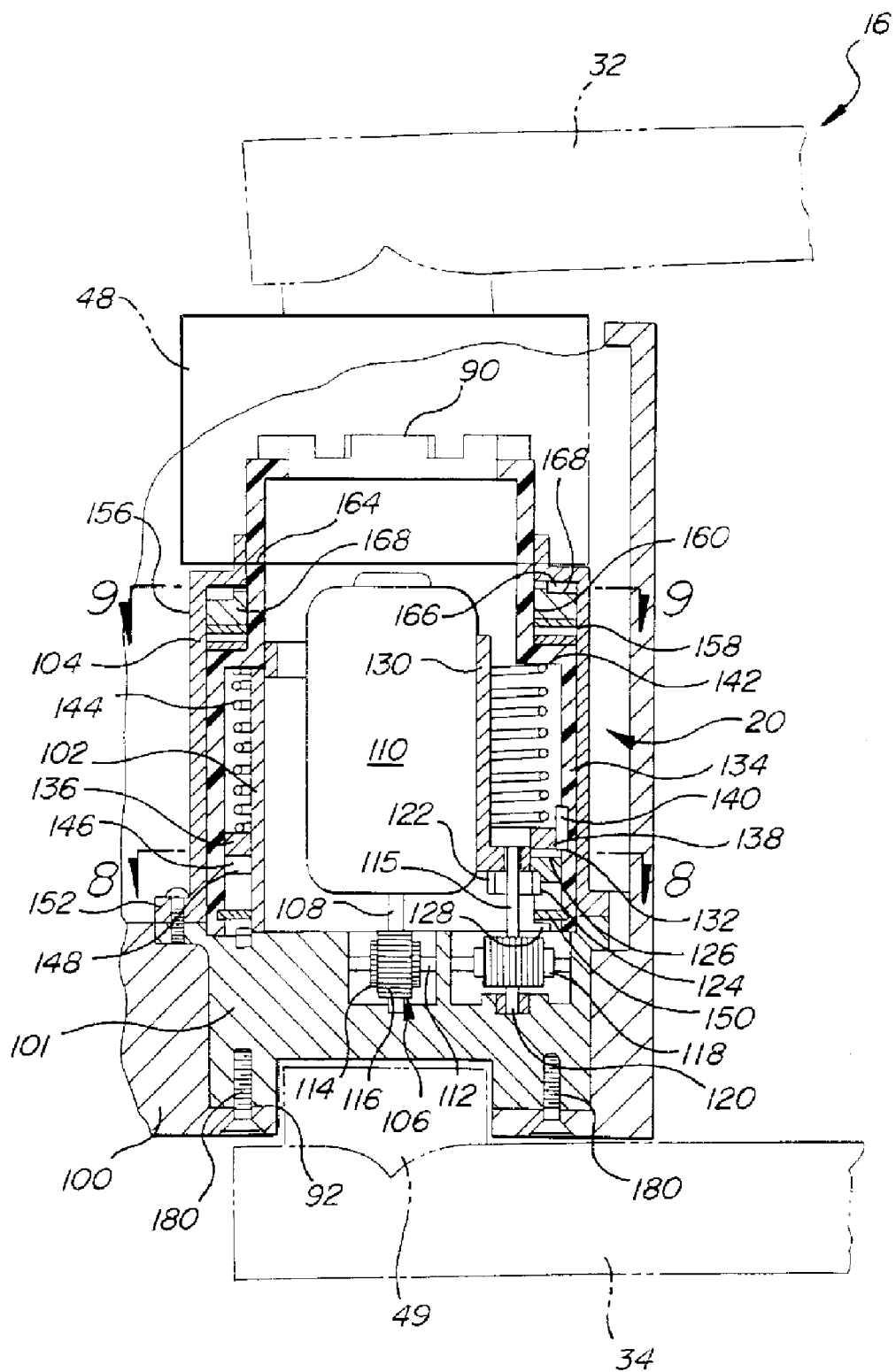
FIG. 7 is an enlarged cross-sectional side view of the fixed support assembly.

Referring to FIGS. 3 and 7, the illustrated vehicle mirror assembly is assembled by coupling upper mating portion 48 with cylindrical drive portion 90 of the first power mechanism 20 and concurrently inserting lower mating portion 49 into cylindrical opening 92 provided in the bottom portion of the first power mechanism 20. The upper and lower support arms 32 and 34 are then inserted into sleeves 36 and 38. The various gears and moving components are then assembled within mounting structure 52. Once the various components are mounted within mounting structure 52, the resulting assembly is then secured to an inner portion of main housing portion 40, and the upper and lower support arms 32, 34 fit within voids located behind mounting structure 52 in a manner so that racks 51, 50 of upper and lower support arms 32, 34 mesh with the upper and lower pinions 54, 78. The cover 42 of the second power mechanism 24 is then secured to the open face of mounting structure 52. Mirror holder 26 and mirror unit 14 are then to be mounted to form a resulting mirror housing 12 as shown in FIG. 1.

In operation, the first power mechanism 20 is operable to pivot swingable structure 16, comprising upper and lower support arms 32, 34 in the illustrated embodiment, between an operative position, as shown in FIG. 1, and a folded position whereby mirror unit 14 is moved toward the direction at which it is proximate to and faces the side of vehicle 19. The first power mechanism 20 is further structured and arranged to enable swingable structure 16 to be pivoted from its operative position, as shown in FIG. 1, toward either direction— either in a counterclockwise or clockwise direction—in response to an unwanted impact below applied in either direction to swingable structure 16 or to mirror housing 12.

Figure 13:
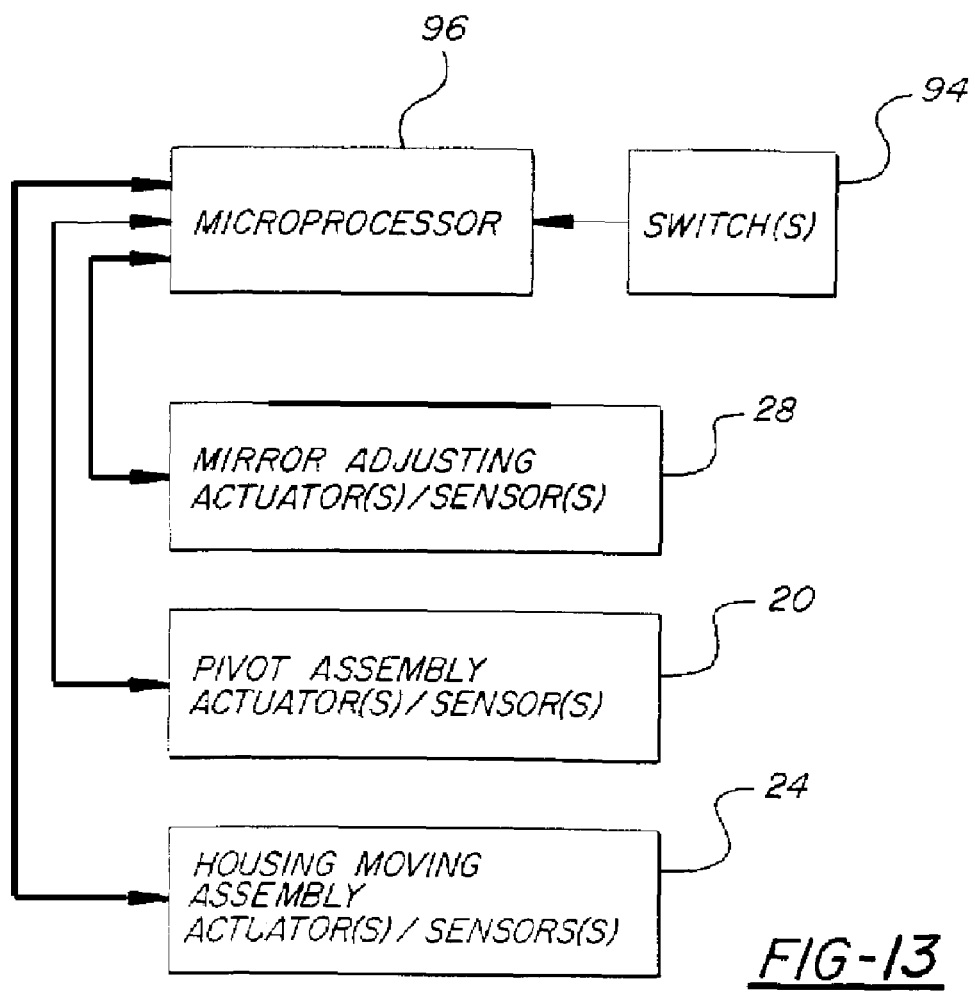
FIG. 13 is a block diagram of a control system for controlling the operation of the various illustrated power mechanisms.

All of the power mechanisms 20, 24 and 28 are electrically operated. As illustrated in FIG. 13, an electronic control system may be provided for controlling the operation of the first power mechanism 20 and the second power mechanism 24 to control the powered pivoting of swingable structure 16 and to control the generally horizontal movement of mirror housing 12 to various positions located between inner and outer limiting positions. Such a control mechanism may be configured to control the operation of the first power mechanism 20 independently of the operation of the second power mechanism 24, or the relative operations can be synchronized or otherwise dependent upon each other. Such a control system would also control the adjustment of the mirror about vertical and horizontal axes by the third power mechanism 26. The control system includes a switch or switches 94 for manually actuating each of the power mechanisms 20, 24 and 28. The control system includes a microprocessor 96 for memorizing adjusted positions of the power mechanisms 20, 24 and 28.

The second power mechanism 24 is operatively associated with swingable structure 16 and housing assembly 12 to move mirror housing 12 between an inner limiting position as shown in FIG. 2 and an outer limiting position as shown in FIG. 1 into any desired position of adjustment along the continuum between the inner and outer limiting positions.

As illustrated in FIG. 7, the first power mechanism 20 is made up of a series of components constructed and arranged to be assembled with respect to a fixed structure 100 in a predetermined sequence of downward movements into a predetermined cooperation relative to one another. The components include an inner fixed tubular member 102 and an outer fixed tubular member 104 which are fixed to fixed structures 100 and 101 concentric with the upright pivotal axis provided by the first power mechanism 20. Also provided are a reversible electric motor 110 disposed within inner tubular member 102 and a speed reducing motion transmitting assembly, generally indicated at 106, between an output shaft 108 of electric motor 110 and swingable structure 16. Inner fixed tubular member 102 is preferably made of cast iron, steel, or similar metal so as to constitute a flux yoke for electric motor 110. The outer fixed tubular member is also preferably made of metal such as steel or the like.

Motion transmitting assembly 106 includes an elongated shaft 112 and a stub shaft 115 which are the first components to be assembled by downward movements into an upwardly opening bearing groove (not shown) and an upwardly opening bore (not shown) respectively formed in fixed structure 101. Motion transmitting assembly 106 also includes a drive gear 116, which, as shown, preferably is a worm gear fixed on motor output shaft 108 and a driven gear 114 in the form of a worm wheel on elongated shaft 112 disposed in meshing relation with worm gear 116. Fixed on elongated shaft 112 is a secondary drive gear 118, which also is preferably a worm gear. A secondary drive gear in the form of a worm wheel 120 is fixed on stub shaft 115 in meshing relation with secondary worm gear 118. Fixed to stub shaft 115 above worm wheel 120 is a pinion gear 122 which meshes with a ring gear 124 having teeth 126 on its interior periphery for meshing with pinion gear 122. Ring gear 124 rests on an exterior annular flange 128 formed on the lower end of inner tubular member 102.

Speed reducing motion transmitting assembly 106 is a non-self-reversing assembly in the sense that the first worm gear set 114, 116 as well as the second worm gear set 118, 120, while capable of being driven in either direction by reversible motor 110, will prevent movement in either direction against that of motor 110.

The bearing groove provided for elongated shaft 112 is enlarged in the area of the first worm gear set 114, 116 and the second worm gear set 118, 120 in that elongated shaft 112 and stub shaft 115 can be moved downwardly together during assembly of one after the other. In the illustrated embodiment, electric motor 110 is fixedly mounted within inner tubular member 102 which is the next component to be assembled by moving an exterior flange 128 on the lower end thereof into engagement with fixed structure 101. The inner tubular member has an L-shaped wall portion 130 in one side thereof, the horizontal lug of which is apertured to receive a bearing 132 within which the upper end of stub shaft 115 is journaled.

In order to positively prevent movement of inner tubular member 102 about its axis which is concentric to the pivotal axis, flange 128 may be suitably pinned to the fixed structure 100/101 or otherwise prevented from turning about its axis. Inner tubular member 102 with electric motor 110 fixed thereto are assembled in such a way as to bring worm gear 116 into meshing relation with worm wheel 114. Moreover, since motor 110 is fixed on fixed structure 100/101, suitable grooves (not shown) can be formed in fixed structure 101 to accommodate electrical control wires (not shown) for motor 110.

Ring gear 66 forms part of a sub-assembly which is mounted within a movable tubular member 134. Movable tubular member 134 is preferably molded of a suitable plastic material. The sub-assembly including movable tubular member 134 can be regarded as a component of the first power mechanism 20.

Figure 8:
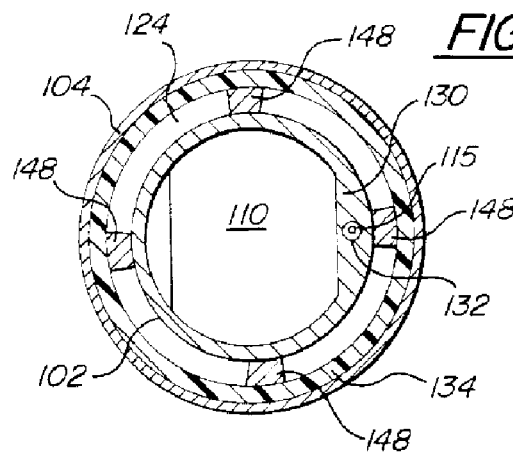
FIG. 8 is a sectional view taken along the line 8-8 of FIG. 7.
Figure 9:
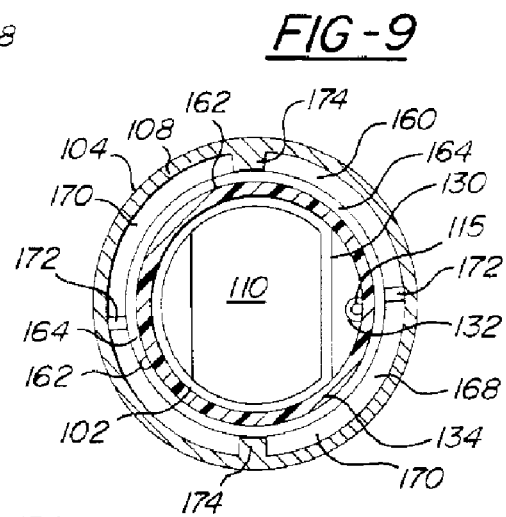
FIG. 9 is a sectional view taken along the line 9-9 of FIG. 7.
Figure 10:
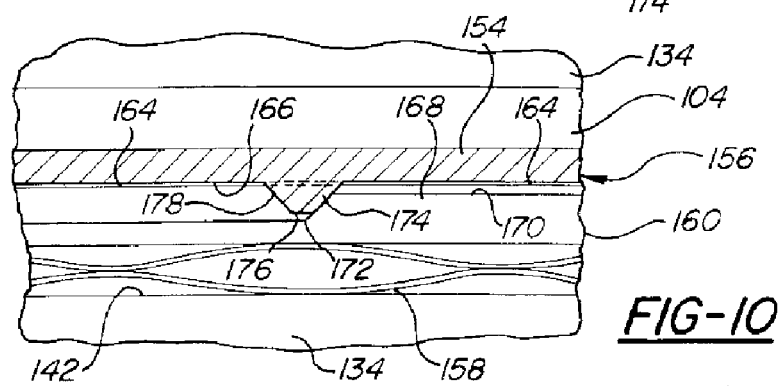
FIG. 10 is an enlarged fragmentary sectional view of the pivot assembly as shown in FIG. 9.
Figure 11:
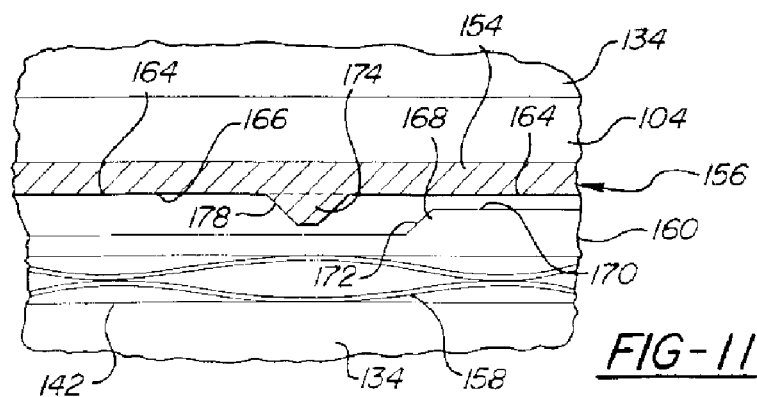
FIG. 11 is a view similar to FIG. 10 showing the position of the components during the movement of the housing assembly from its operative position to the rear fold position.
Figure 12:
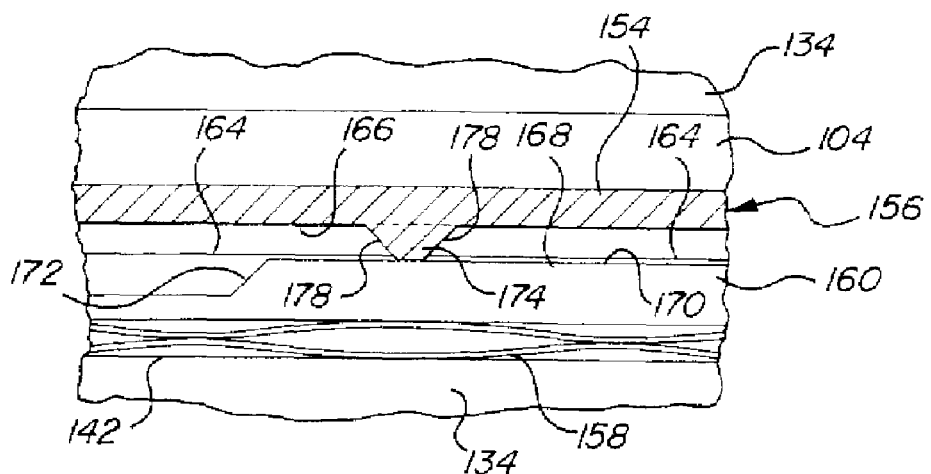
FIG. 12 is a view similar to FIG. 10 showing the position of the components during the movement of the housing assembly from its operative position to the forward fold position.

The sub-assembly includes a spring biased indexing system, generally indicated at 136 mounted between ring gear 124 and movable tubular member 134. As best shown in FIGS. 7 and 8, indexing system 136 includes an indexing ring 138 which is keyed to the interior periphery of movable tubular member 134, as by key elements 140, so that it can move axially with respect to movable tubular member 134 but must move with movable member 134 as it turns about its vertical axis. Movable tubular member 134 includes a radially extending portion 142 and its upper midsection which provides a downwardly facing surface on the interior periphery of movable tubular member 134. A coil spring 144 for biasing indexing system 136 has its upper end seated on the downwardly facing surface of portion 142 and its lower end seated on indexing ring 138. Indexing ring 138 has four annularly spaced downwardly opening recesses 146 formed therein, the arcuate extent of which is defined by opposite inclined surfaces. Ring gear 124 has four annularly spaced indexing projections 148 which are shaped to be received in recesses 146. The sub-assembly pieces comprising coil spring 144, indexing ring 138, and ring gear 124, are moved respectively into the interior periphery of movable tubular member 134 and retained therein with the spring in stressed condition by a conventional C-clip 150.

Movable tubular member 134 with its contained sub-assembly is assembled next by being moved downwardly over inner tubular member 102 to mesh ring gear 124 with pinion gear 122 until the lower end of movable tubular member 134 rests on fixed structure 101.

Outer tubular member 104 is the last component of first power mechanism 20 to be assembled. Outer tubular member 104 has an exteriorly extended flange 152 at its lower end and an interiorly directed flange 154 at its upper end. The axial extent of the outer tubular member 104 is greater than the axial extent of the movable tubular member 134 below radial portion 142 but less than the full axial extent thereof. The relative axial sizes are such that, when outer tubular member 104 is assembled over movable tubular member 134 with lower flange 152 engaging fixed structure 101, annular space is left between the lower surface of upper flange 154 and the upper surface of radial portion 142. Within this annular space, a spring biased control system, generally indicated at 156, is mounted.

As best shown in FIGS. 9-12, spring biased control system 156 includes a biasing spring 158 in the form of a wavy ring of spring steel mounted over the upper periphery of movable tubular member 134 until it is seated on the upper surface of radial portion 142. Control system 156 also includes a control ring 160 which is mounted over the upper periphery of the movable tubular member until it is seated on wavy ring spring 158. Control ring 160 is keyed to the upper exterior periphery of movable tubular member 134 by key elements 162 so that it must move with movable tubular member 134 when it turns about its axis but may have axial movement against spring 158 with respect to movable tubular member 134.

Control ring 160 constitutes a movable control structure which is connected through motion transmitting assembly 106 and spring-biased indexing system 136 to move with swingable structure 16. Upper flange 154 of outer tubular member 104 constitutes a fixed control structure which is fixed with respect to fixed structures 100, 101.

Control structures 154 and 160 provide interengaging control surfaces which may take any desired form capable of achieving the functions hereinafter specified. However, as shown, the control surfaces include a flat radially disposed inner upwardly facing annular surface 164 formed on control ring 160 and a mating flat radially-disposed inner downwardly facing annular surface 166 on flange 154. It will be noted that annular control surface 164 may be divided into discrete arcuate surface portions by the recesses provided which receive key elements 162. Control ring 160 includes a pair of annularly spaced relatively large arcuate projections 168 disposed outwardly of the annular control surface 164 thereof. Projections 168 define control surfaces which for each projection 168 include a flat radially disposed upwardly facing arcuate surface 170 having an inclined surface 172 extending downwardly and arcuately away from each end thereof.

The annular flange 154 includes a pair of annularly spaced relatively small arcuate projections 174 disposed outwardly of annular control surface 166. Projections 174 define control surfaces which for each projection 174 includes a flat radially disposed downwardly facing arcuate surface 176 having an inclined surface 278 extending upwardly and arcuately away from each end thereof.

Referring again to FIG. 7, final assembly of pivot assembly is completed by extending fasteners 180 through recesses provided and lower flanged portions of fixed structure 100 and securing fasteners 180 into corresponding recesses provided within fixed structure 101.

Further details concerning the structure of first power mechanism 20 may be implemented in accordance with the description provided in commonly-assigned U.S. Pat. No. 5,703,732, which is fully incorporated by reference herein.

While the invention has been described with reference to a preferred embodiment, it is understood that the words that have been used herein are words of description, rather than words of limitation. Changes may be made, within the purview of the appended claims, without departing from the scope and spirit of the invention in its aspects. Although the invention has been described herein in reference to particular elements, materials and embodiments, it is understood that the invention is not to be limited to the particulars disclosed herein, and that the invention extends to all equivalent structures, methods, and uses, such as are within the scope of the appended claims.

What is claimed is:

1. An exterior mirror system suitable for a vehicle, said system comprising:

an exterior mirror assembly;

said exterior mirror assembly comprising a fixed support adapted to be mounted to the side of the vehicle;

said exterior mirror assembly comprising a support arm extending from said fixed support to a distal end;

a mirror housing supported by said support arm and movable along said support arm from a first position proximate to said fixed support to a second position proximate said distal end of said support arm;

said exterior mirror assembly comprising an electrically powered pivoting and extending mechanism for pivoting said support arm about said fixed support between an operative position wherein said support arm generally extends outwards from said fixed support and a folded position wherein said support arm generally extends transverse to said operative position and is generally folded to said side of the vehicle and for moving said mirror housing relative to said fixed support along said support arm from said first position to said second position;

said mirror housing comprising a mirror unit and an electrically powered mirror unit adjust mechanism disposed in said mirror housing and operable to adjust said mirror unit to a desired adjusted position about horizontal and vertical axes;

an electronic control system, said control system operable by the driver of the vehicle to control operation of said powered pivoting and extending mechanism independent of operation of said powered mirror unit adjust mechanism; and wherein said powered pivoting and extending mechanism comprises a worm gear, a clutch and a reversible motor.

2. The exterior mirror system of claim 1, wherein said electronic control system comprises a microprocessor and wherein a processing by said microprocessor controls at least one of (i) a movement of said mirror housing along said support arm, (ii) a folding of said support arm, and (iii) an adjustment of said mirror unit.

3. The exterior mirror system of claim 1, wherein said electronic control system comprises a memorized position for said powered pivoting and extending mechanism.

4. The exterior mirror system of claim 1, wherein said support arm comprises at least one metal tubular member and wherein said metal tubular member constitutes a flux yoke for an electric motor.

5. The exterior mirror system of claim 1, wherein said electronic control system comprises a microprocessor and wherein said microprocessor processes a memorized adjusted position for at least one of (i) said powered pivoting and extending mechanism and (ii) said powered mirror unit adjust mechanism.

6. The exterior mirror system of claim 1, wherein said electronic control system comprises a microprocessor and wherein said microprocessor processes a memorized adjusted position for both of (i) said powered pivoting and extending mechanism and (ii) said powered mirror unit adjust mechanism.

* * * * *